United States Patent
Gysen

(10) Patent No.: US 12,176,767 B2
(45) Date of Patent: Dec. 24, 2024

(54) POSITION SENSOR FOR A MOVER IN A LONG STROKE LINEAR PERMANENT MAGNET MOTOR

(71) Applicant: PRODRIVE TECHNOLOGIES INNOVATION SERVICES B.V., Son (NL)

(72) Inventor: Bart Ludo Jozef Gysen, Son (NL)

(73) Assignee: PRODRIVE TECHNOLOGIES INNOVATION SERVICES B.V., Son (NL)

(*) Notice: Subject to any disclaimer, the term of this patent is extended or adjusted under 35 U.S.C. 154(b) by 601 days.

(21) Appl. No.: 17/421,140

(22) PCT Filed: Jan. 27, 2020

(86) PCT No.: PCT/EP2020/051938
§ 371 (c)(1),
(2) Date: Jul. 7, 2021

(87) PCT Pub. No.: WO2020/157013
PCT Pub. Date: Aug. 6, 2020

(65) Prior Publication Data
US 2022/0077751 A1 Mar. 10, 2022

(30) Foreign Application Priority Data
Jan. 28, 2019 (NL) .................................. 2022467

(51) Int. Cl.
*H02K 11/215* (2016.01)
*G01D 5/14* (2006.01)
*H02K 41/03* (2006.01)

(52) U.S. Cl.
CPC ........... *H02K 11/215* (2016.01); *G01D 5/145* (2013.01); *H02K 41/031* (2013.01)

(58) Field of Classification Search
CPC ...... H02K 41/02; H02K 41/031; H02K 1/148; H02K 1/278; H02K 2213/03; H02K 11/215; G01D 5/145
(Continued)

(56) References Cited

U.S. PATENT DOCUMENTS 4,318,038 A * 3/1982 Munehiro .......... H02K 41/0356
400/322
4,370,577 A * 1/1983 Wakabayashi ......... H02K 41/03
310/12.24
(Continued)

FOREIGN PATENT DOCUMENTS

CN 102457155 A 5/2012
DE 10004774 A1 11/2000
(Continued)

OTHER PUBLICATIONS

International Search Report and Written Opinion of the International Searching Authority from the European Patent Office, in PCT/EP2020/051938 dated Mar. 31, 2020, which is an international application corresponding to this U.S. application.

*Primary Examiner* — Maged M Almawri
(74) *Attorney, Agent, or Firm* — Kolitch Romano Dascenzo Gates LLC

(57) ABSTRACT

A linear permanent magnet motor may include a stator unit having a coil, a mover including an array of permanent magnets, and a position sensing device operable to determine a position of the mover. The mover is arranged to move along a motion direction. The position sensing device has a sensing element operable to sense a magnetic field of the array of permanent magnets The sensing element is fixed to the stator unit. The array of permanent magnets is spaced apart from the stator unit by an air gap in which electromagnetic fields created by the array of permanent magnets and by coil are configured to interact thereby generating (Continued)

traction. The sensing element is positioned such that it is within a magnetic leakage field of the array of permanent magnets when the array of permanent magnets is positioned in correspondence with the sensing element.

20 Claims, 7 Drawing Sheets

(58) Field of Classification Search
USPC ......... 310/12.01, 12.21, 12.22, 12.24, 12.25, 310/12.26, 12, 14, 15, 23, 30, 37, 12.18
See application file for complete search history.

(56) References Cited

U.S. PATENT DOCUMENTS

| | | | | |
|---|---|---|---|---|
| 4,678,971 A * | 7/1987 | Kanazawa | ........... | H02K 41/031 318/135 |
| 5,023,495 A * | 6/1991 | Ohsaka | ................ | H02K 41/031 318/135 |
| 5,047,676 A * | 9/1991 | Ichikawa | ............... | B65G 54/02 318/135 |
| 5,357,158 A * | 10/1994 | Takei | ................... | H02K 41/031 310/68 B |
| 5,565,718 A * | 10/1996 | Takei | ................... | H02K 41/031 310/12.25 |
| 5,796,186 A * | 8/1998 | Nanba | .................... | H02K 41/03 310/12.24 |
| 5,841,250 A * | 11/1998 | Korenage | ............. | H01L 21/682 318/135 |
| 5,909,066 A * | 6/1999 | Nanba | .................. | H02K 41/03 310/12.14 |
| 5,950,773 A * | 9/1999 | Ito | .......................... | H02K 7/102 188/67 |
| 6,084,319 A * | 7/2000 | Kamata | ................ | H02K 41/031 310/58 |
| 6,107,703 A * | 8/2000 | Korenaga | ........... | G03F 7/70691 310/12.21 |
| 6,166,470 A * | 12/2000 | Miyazawa | ............. | H02K 3/525 310/194 |
| 6,271,606 B1 * | 8/2001 | Hazelton | ............. | G03F 7/70758 310/12.32 |
| 6,348,746 B1 * | 2/2002 | Fujisawa | .............. | H02K 41/031 310/12.24 |
| 6,400,046 B1 * | 6/2002 | Hwang | .................. | H02K 41/03 310/12.24 |
| 6,417,914 B1 * | 7/2002 | Li | ...................... | G03F 7/70758 310/12.32 |
| 6,590,355 B1 * | 7/2003 | Kikuchi | ................. | H02K 41/03 310/12.21 |
| 6,665,053 B2 * | 12/2003 | Korenaga | ........... | H01L 21/682 355/75 |
| 6,717,294 B2 * | 4/2004 | Chuo | .................... | H02K 41/03 310/12.06 |
| 6,744,228 B1 * | 6/2004 | Cahill | .................. | H02K 41/031 318/135 |
| 6,791,670 B2 * | 9/2004 | Miyajima | ........... | G03F 7/70758 355/75 |
| 6,836,031 B2 * | 12/2004 | Emoto | .................... | H02K 3/47 310/12.21 |
| 6,847,132 B2 * | 1/2005 | Ukaji | .................. | G03F 7/70858 310/58 |
| 6,859,257 B2 * | 2/2005 | Korenaga | ........... | G03F 7/70725 318/647 |
| 6,864,602 B2 * | 3/2005 | Korenaga | ........... | G03F 7/70758 318/135 |
| 6,873,404 B2 * | 3/2005 | Korenaga | ........... | G03F 7/70758 355/75 |
| 6,876,106 B2 * | 4/2005 | Miyashita | ............. | H02K 41/03 310/12.24 |
| 6,903,468 B2 * | 6/2005 | Korenaga | ........... | G03F 7/70758 355/53 |
| 6,917,046 B2 * | 7/2005 | Korenaga | ............... | H01J 37/20 250/442.11 |
| 6,946,757 B2 * | 9/2005 | Korenaga | ........... | H02K 41/031 310/90.5 |
| 6,954,041 B2 * | 10/2005 | Korenaga | ........... | G03F 7/70816 318/135 |
| 6,972,499 B2 * | 12/2005 | Emoto | .................... | H02K 9/227 310/12.25 |
| 6,987,335 B2 * | 1/2006 | Korenaga | .............. | H02N 15/02 310/12.15 |
| 7,067,942 B2 * | 6/2006 | Korenaga | ........... | H02K 41/031 310/12.25 |
| 7,245,048 B2 * | 7/2007 | Fujii | ...................... | H04R 7/045 345/157 |
| 7,271,510 B2 * | 9/2007 | Niwatsukino | ....... | G03F 7/70758 410/13 |
| 7,282,819 B2 * | 10/2007 | Korenaga | .............. | H02K 41/03 74/471 XY |
| 7,425,783 B2 * | 9/2008 | Sakiya | .................... | H02P 25/06 310/12.22 |
| 7,482,716 B2 * | 1/2009 | Sugita | .................... | H02K 41/03 310/12.25 |
| 7,508,099 B2 * | 3/2009 | Korenaga | ........... | G03F 7/70758 355/72 |
| 8,358,039 B2 * | 1/2013 | Trumper | ................ | G01Q 10/04 310/12.24 |
| 8,485,350 B2 * | 7/2013 | Reinisch | ................ | H02K 41/03 198/618 |
| 8,502,421 B2 * | 8/2013 | Markon | ............... | H02K 41/031 310/12.05 |
| 8,541,911 B2 * | 9/2013 | Evers | .................... | F16F 15/023 310/12.04 |
| 8,733,541 B2 * | 5/2014 | van de Loecht | ..... | H02K 41/031 198/805 |
| 9,394,114 B2 * | 7/2016 | Hanisch | ................. | B65G 54/02 |
| 9,804,507 B2 * | 10/2017 | Hoshino | ............ | G03F 7/70725 |
| 9,892,837 B2 * | 2/2018 | Rokosz | ................... | H01F 7/081 |
| 10,666,123 B2 * | 5/2020 | Gause | .................... | H02K 1/18 |
| 11,360,400 B2 * | 6/2022 | Trumper | ................ | H02K 41/03 |
| 2004/0100153 A1 * | 5/2004 | Korenaga | ........... | G03F 7/70716 355/72 |
| 2004/0207271 A1 * | 10/2004 | Korenaga | ............... | H01J 37/20 310/12.25 |
| 2007/0035184 A1 | 2/2007 | Sakiya | | |
| 2008/0265688 A1 * | 10/2008 | Nakano | ................ | H02K 41/031 310/12.24 |
| 2010/0127580 A1 * | 5/2010 | Schrader | ................ | H02K 41/02 310/12.26 |
| 2014/0042833 A1 * | 2/2014 | Hiura | .................... | H02K 41/031 310/14 |
| 2015/0022030 A1 | 1/2015 | Rohner et al. | | |
| 2018/0113002 A1 * | 4/2018 | Shimizu | ............... | H02K 11/215 |
| 2019/0386530 A1 * | 12/2019 | Takahashi | ............ | H02K 1/2746 |

FOREIGN PATENT DOCUMENTS

| | | |
|---|---|---|
| DE | 112006002849 T5 | 9/2008 |
| EP | 0905869 A2 | 3/1999 |
| EP | 1220429 A2 | 7/2002 |
| JP | H0622412 A | 1/1994 |
| JP | H1056792 A | 2/1998 |
| JP | 2001254812 A | 9/2001 |
| JP | 2002204001 A | 7/2002 |
| JP | 2011106446 A | 6/2011 |
| JP | 2012090467 A | 5/2012 |
| JP | 2012208063 A | 10/2012 |
| JP | 2017101783 A | 6/2017 |
| KR | 20120126670 A | 11/2012 |
| KR | 1020150145407 A | 12/2015 |
| WO | WO2016125367 A1 | 8/2016 |
| WO | 2017143500 | 8/2017 |

* cited by examiner

FIG 6

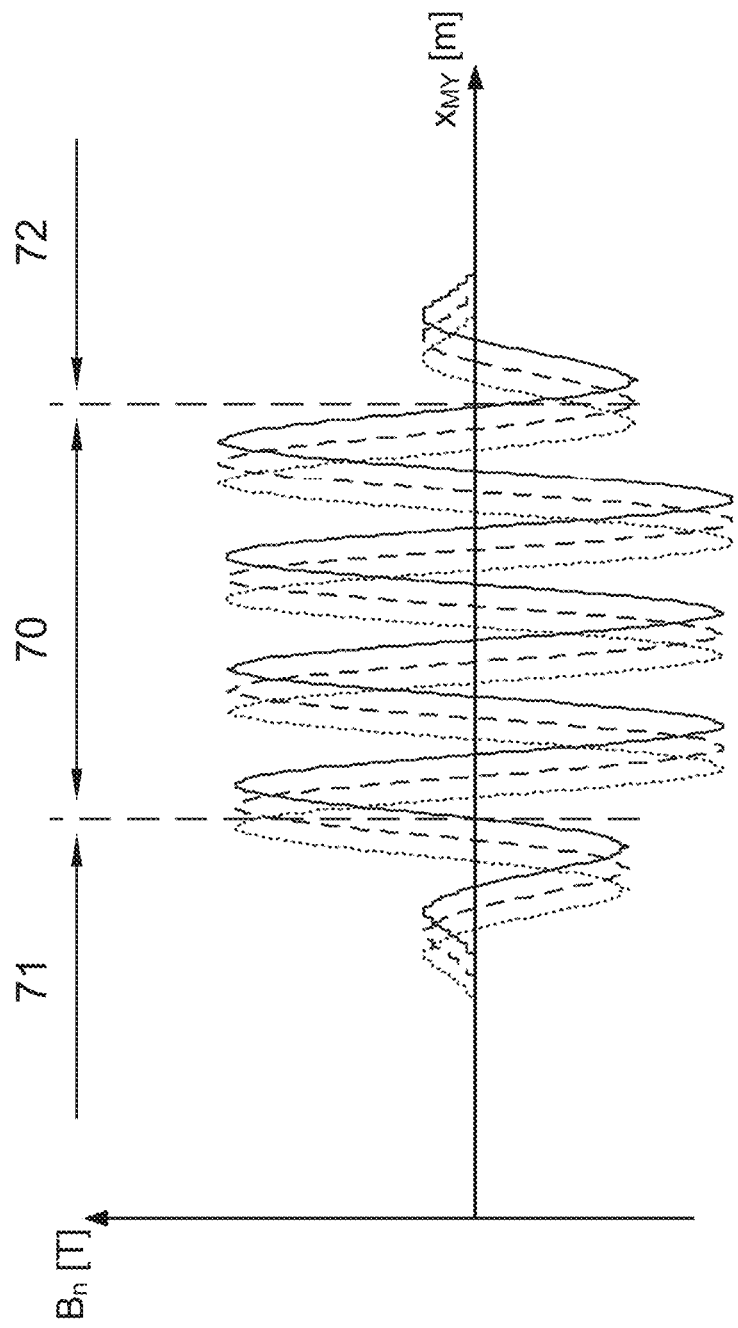

POSITION SENSOR FOR A MOVER IN A LONG STROKE LINEAR PERMANENT MAGNET MOTOR

TECHNICAL FIELD

The present disclosure is related to a linear permanent magnet motor, more particularly to long stroke linear permanent magnet motors equipped with position sensors for detecting or determining a position of the mover with respect to the stator.

INTRODUCTION

KR 10-2015-0145407 describes a linear motor capable to measure the absolute position of the moving unit, referred to as mover. A plurality of Hall sensors are provided on the stator unit. On the mover, provided with permanent magnets, a reference portion is mounted, formed of a different material compared to the permanent magnets and therefore providing an altered magnetic field in proximity of the reference portion. The Hall sensors are positioned such that the altered magnetic field can be sensed.

The Hall sensors can therefore detect when a reference portion of the mover passes by, and an absolute position can be determined. One drawback however is that the mover must be equipped with such a reference portion, which is made of a material having magnetic properties different from the adjacent permanent magnets. Therefore, this reference portion deteriorates the performance of the motor. Another drawback is that the Hall sensors are located within the main field of the permanent magnets when these move along, leading to saturation of the sensors in case of analog measurement. Analog measurements are required to obtain a position sensor with a higher resolution without adding too many sensors. Yet another drawback is that the Hall sensors are mounted between and/or adjacent to the coils, which tend to heat up during operation, thereby increasing the temperature of the Hall sensors. As the sensitivity of the Hall sensors is temperature-dependent, this may make reliable measurement difficult.

SUMMARY

It is an aim of aspects of the present disclosure to overcome the above drawbacks. In particular, it is an aim to provide positioning capability in a linear permanent magnet motor which is more reliable, yet simpler and therefore more cost effective, and which does not affect the performance of the linear motor.

It is an aim of aspects of the present disclosure to provide a linear permanent magnet motor which is more accurate in positioning capability without requiring use of expensive components, such as linear encoders. It is an aim to provide such linear permanent magnet motors which allow for accurate positioning over a long stroke.

According to the present disclosure, there is provided a linear (i.e., having a linear stroke) permanent magnet motor. The motor comprises at least one, advantageously a plurality of stator units and a mover, or a plurality of movers. Each stator unit comprises at least one coil for generating a magnetic field. The mover comprises an array of permanent magnets spaced apart from the stator unit. An air gap is interposed between the array of permanent magnets and the stator unit. Electromagnetic fields of the permanent magnets of the array and electromagnetic fields generated by the at least one coil interact in the air gap to create a traction force on the mover relative to the stator unit. The mover is arranged to move along a motion direction. The permanent magnets in the array are advantageously spaced apart from one another with a defined pitch along the motion direction. The array of permanent magnets advantageously has a surface exposed to the air gap. The surface is advantageously planar and is parallel to the motion direction. The motor further comprises a position sensing device operable to determine a position of the mover relative to the (respective) stator unit.

The position sensing device comprises a sensing element operable to sense a magnetic field of the mover (i.e. of the array of permanent magnets). The sensing element is fixed to the stator unit.

According to a first aspect described herein, the sensing element is positioned such that it is within a magnetic leakage field of the array of permanent magnets when the array of permanent magnets is positioned in correspondence with the sensing element along the motion direction. The leakage field is the part of the magnetic field generated by the mover that is not linked by the stator unit. In other words, the leakage field is formed of magnetic field lines which do not connect with the coil of the stator unit when the array of permanent magnets passes by.

According to a second aspect described herein, which can be provided in combination with or independent of the first aspect above, the sensing element is positioned such that an orthogonal projection of the sensing element on a median plane of the air gap parallel to the exposed surface of the array of permanent magnets falls outside a band formed by an orthogonal projection of (a perimeter of) the array of permanent magnets on the median plane when moving along the motion direction. Advantageously, when the sensing element is positioned within a magnetic leakage field of the array of permanent magnets, the orthogonal projection of its position on the median plane of the air gap falls outside the band formed by orthogonal projection of the array of permanent magnets on the median plane when moving along the motion direction.

By arranging the sensing element as indicated according to the first or second aspect above, the sensing element is positioned at a location where the field of the array of permanent magnets is greatly reduced in strength, when the mover passes along, so that saturation of the sensing element is avoided. As a result, the sensing element can provide an output which is continuously proportional to the sensed magnetic field strength allowing for accurate determination of a position of the mover relative to the stator unit, so that an accurate and advantageously absolute position of the mover can be determined based on only the sensing element (s) and without relying on expensive encoders. This allows for using the sensing element for accurate position sensing, obviating the need for linear encoders.

As the magnetic leakage field is considerably weaker than the main magnetic field at such positions, there is less risk of saturation of the sensing elements, such as Hall sensors or magnetoresistive sensors. It is therefore more suitable to perform analog measurements, resulting in a higher resolution of the position measurements without adding more sensing elements.

Furthermore, at such remote location from the permanent magnets, the sensing elements can additionally be mounted more remotely from the coils as compared to the prior art, such that there is less risk of warming up of the sensors due to heat generation from the coils.

Yet additionally, a position above or below the permanent magnets (as seen in the orthogonal projection) is possible, resulting in the possibility of arranging coils of the stator units closer to one another, resulting in a motor having a higher force density.

BRIEF DESCRIPTION OF THE DRAWINGS

Aspects of the present disclosure will now be described in more detail with reference to the appended drawings, wherein same reference numerals illustrate same features and wherein:

FIG. 6 represents a working scheme of a drive for a stator unit with coil field compensation for the sensors;

FIG. 7 represents a graph of waveforms of an approaching magnet yoke as sensed by three Hall effect sensors positioned at an equidistance of $\tau_p/3$ from one another.

DETAILED DESCRIPTION

Figure 1:
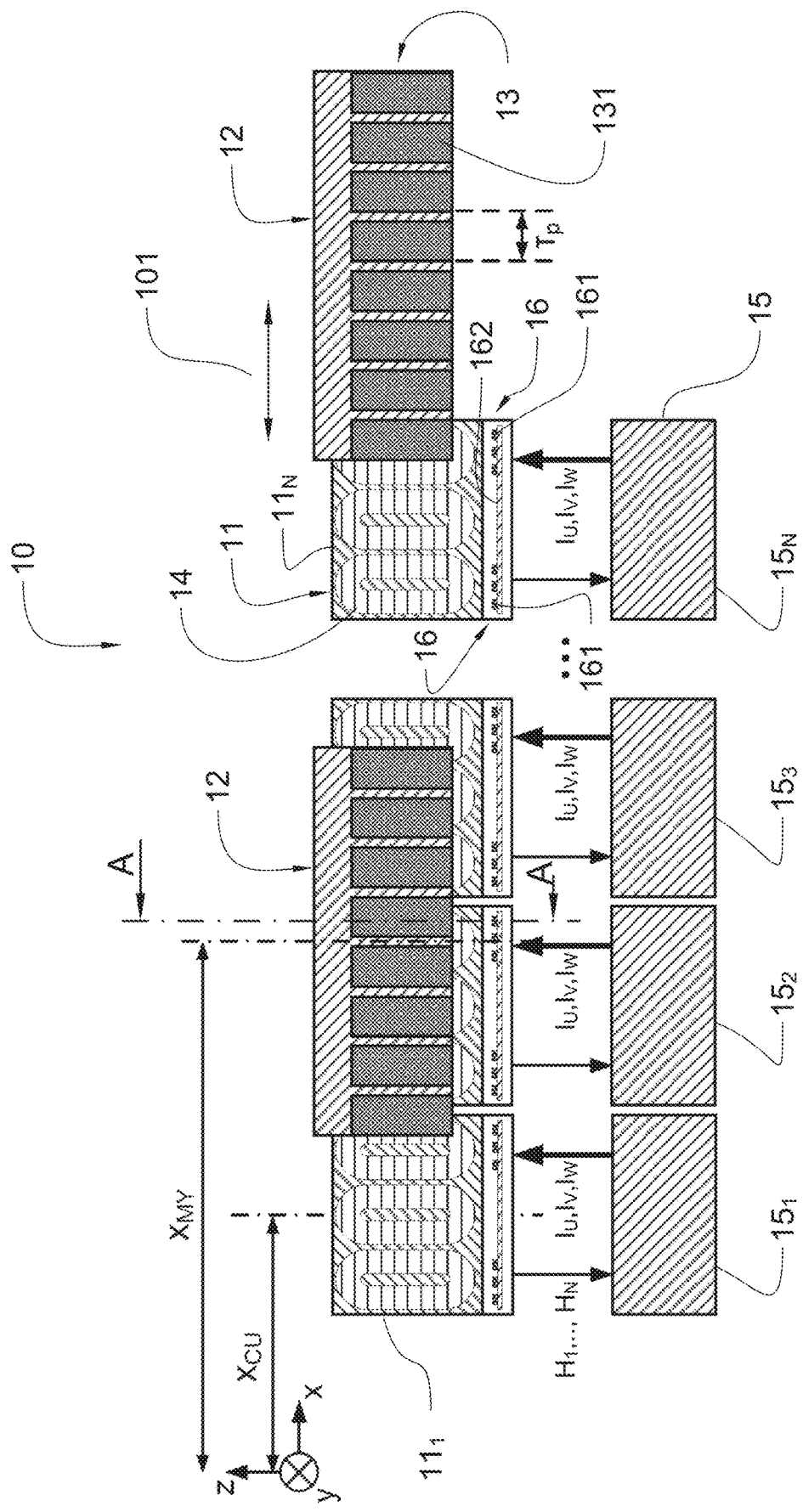
FIG. 1 represents a schematic plan view of a permanent magnet linear motor according to aspects of the present disclosure.
Figure 2:
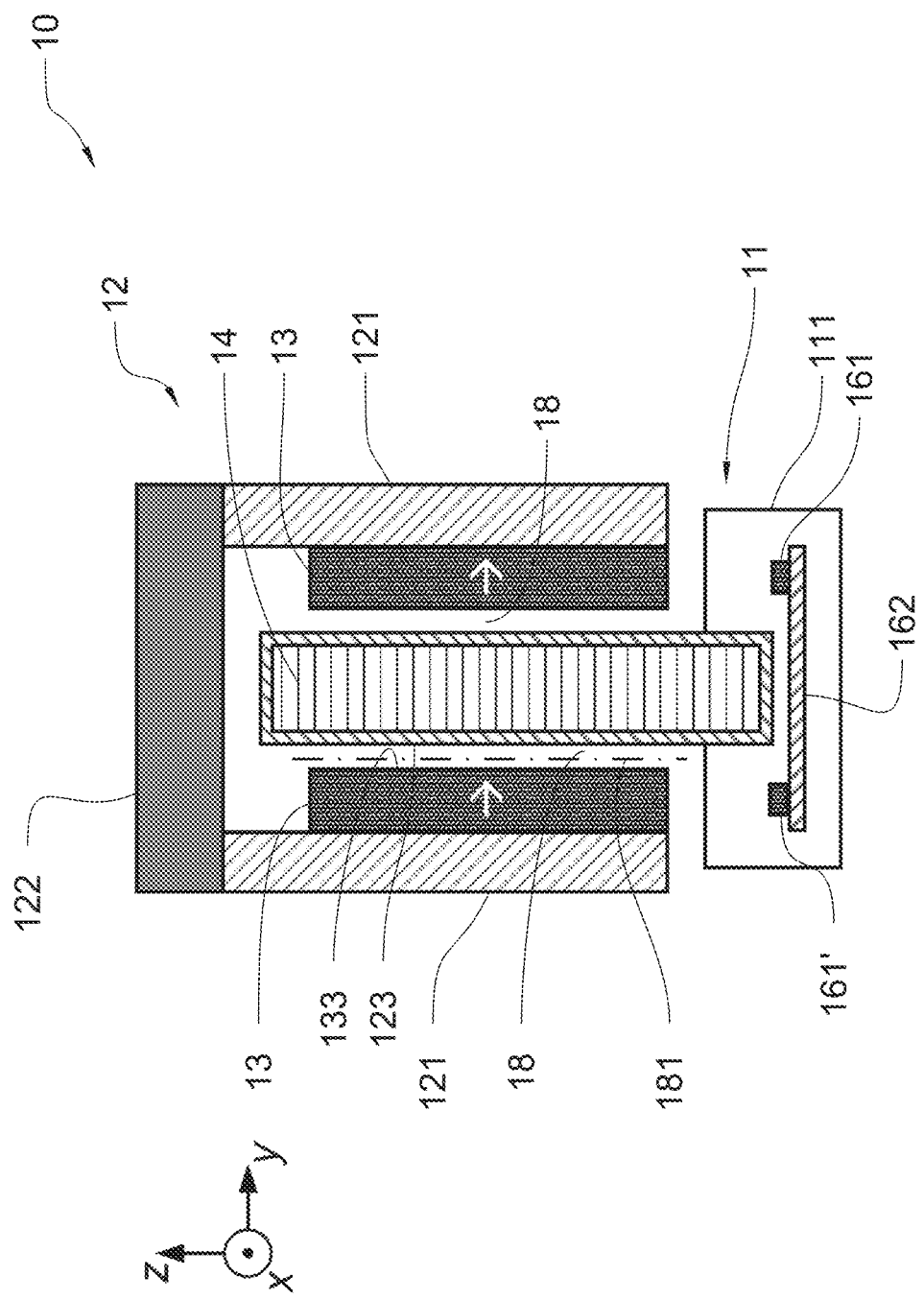
FIG. 2 represents a cross sectional view of the permanent magnet linear motor of FIG. 1 along section line A-A.

Referring to FIGS. 1 and 2, a linear motor 10 according to aspects of the present disclosure comprises at least one, but typically a plurality of stator units 11, arranged to be kept static and at least one mover 12 arranged to move relative to the stator units. In the example of FIG. 1, two movers 12 are depicted, which are arranged to move along an array of stator units 11. The depicted system may prove useful e.g. in a transportation system, such as for elevators, conveying lines, maglev trains, etc.

The mover comprises a magnet yoke 13. The magnet yoke 13 typically comprises a plurality of permanent magnets 131, typically arranged in one or more arrays, and oriented in such a way to create an alternating magnetic field pattern in the direction of motion 101, which pattern is directed towards the coils 14 mounted in the stator unit 11. As shown in FIG. 2, the magnets 131 can be mounted on a back plate 121 that is optionally made from iron to create a low reluctant return path for the magnetic flux.

Still referring to FIG. 2, the mover 12 can comprise a portal structure 122 having a substantial inverted U-shape arranged over the stator unit 11. Permanent magnets 131 are arranged in two arrays, one at each leg of the U-shape, and the coils 14 of the stator unit 11 being interposed between them. It will be convenient to note that a portal structure is just one possible example of a mover structure, and other structures may be used, e.g. a mover with a single array of permanent magnets arranged at one side of the coils 14 only, or a double portal structure with double array of stator units.

The stator unit 11 and the mover 12/magnet yoke 13 are separated by an air gap 18. The electromagnetic field of the permanent magnets 131 and the electromagnetic field generated by the coils 14 interact in the air gap 18 to create a traction force on the mover 12 relative to the stator unit 11.

Each stator unit 11 typically comprises a plurality of coils 14 coupled to a drive unit 15. Referring to FIG. 1, the linear motor 10 can comprise a plurality of stator units 11 ($11_1$, . . . , $11_N$), each one having its own/independent drive unit 15 ($15_1, 15_2, 15_3, \ldots, 15_N$). The individual coils 14 of the stator unit 11 are grouped in a number of phases (generally three phase). The drive unit 15 controls the current through the coils 14 to produce a phase shifted alternating magnetic field which interacts with the magnetic field generated by the magnet yoke 13. The current in each phase is regulated by drive unit 15 to obtain a near constant thrust force irrespective of position. When the mover 12 is moving at constant speed relative to the stator unit 11, a sinusoidal voltage is induced in the coil as a result of the alternating magnetic field of the magnet yoke 13. If for each phase, a sinusoidal current is applied which is in phase with this induced voltage, a positive force is obtained with varying amplitude. If the number of phases is a minimum of 3 and each phase is physically displaced by $n2\tau_p/P$ in the direction of motion, a near constant force irrespective of position can be obtained ($\tau_p$ is the magnet north to south distance, called pole pitch, P is the number of phases and n is an integer except a multiple of P). The control of these currents to obtain a near constant force irrespective of position is referred to as commutation. The amplitude of the current regulates the total magnitude of the force.

For typical applications, the travelling distance is much longer than the length of the magnet yoke 13, which requires the stator unit 11 to be much longer than the magnet yoke length. Due to the fact that the coils that do not overlap the magnet yoke would only dissipate heat without creating force, the coils are segmented into multiple smaller stator units 11 which are being switched on as the magnet yoke approaches. Also in case multiple movers are considered, the stator units 11 are controlled individually, advantageously each by a separate drive unit 15, since the position of the movers with respect to the stator units is different.

In order to know when to activate the coils 14 of a particular stator unit 11, the position of the mover 12 that is approaching must be determined. Position sensing is required for both commutation (controlling the multi-phase currents depending on the relative position between the coils and the magnet yoke(s)), and position control of the magnet yoke(s). For typical moving magnet applications as stated hereinabove, the following requirements generally hold: an accuracy on the order of 0.1 mm, and a large air gap variation (on the order of 1 mm or higher).

To this end, according to aspects of the present disclosure, each stator unit 11 comprises a position sensing device 16 operable to sense a position of the mover 12 relative to the stator unit 11. The position sensing device 16 is configured to determine the magnet yoke position by sensing the magnetic field of the magnet yoke using magnetic field sensors 161. Specific examples of suitable sensors are Hall effect sensors, and magnetoresistive (MR) sensors. The sensors 161 are advantageously arranged at the ends of the stator unit 11, in the direction of motion 101. By so doing, the mover 12 can be detected as it approaches the respective stator unit. Advantageously, each position sensing device 16 can comprise a plurality of sensors (e.g. three), each sensor operable to measure a magnetic field in a same direction, or in a different orthogonal direction, e.g. X, Y, Z as shown in FIG. 1.

According to aspects of the present disclosure, the sensors 161 are arranged at positions in which the magnetic field of the magnet yoke 13, as the mover 12 passes by, is of lower strength. In particular, the sensors 161 are arranged at positions corresponding to a magnetic leakage field of the magnet yoke 13 (permanent magnets 131). By so doing, saturation of the sensors 161 can be avoided or greatly reduced, which improves measurement accuracy and resolution.

Figure 3:
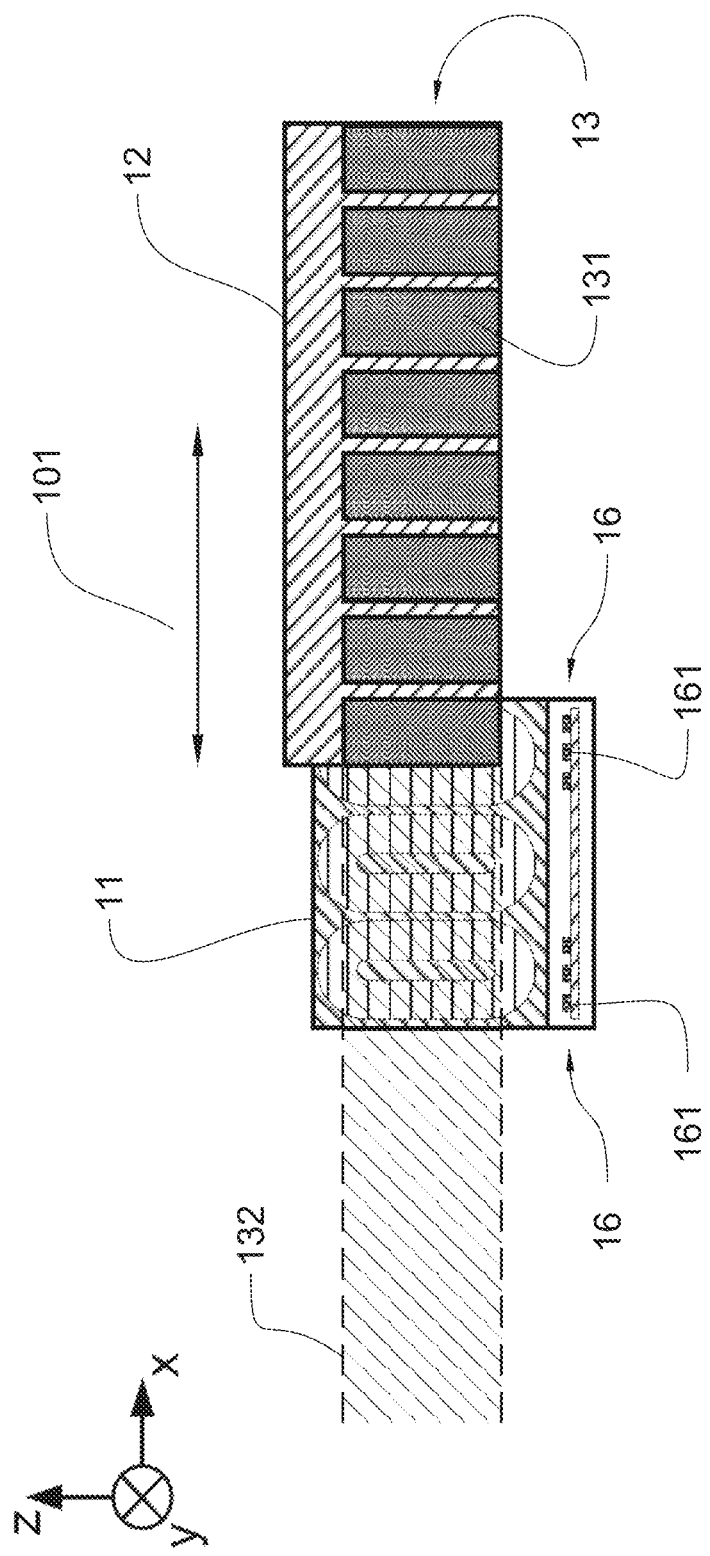
FIG. 3 represents the view of FIG. 1 with indication of a band wherein magnetic field of the magnet yoke is highest.
Figure 4:
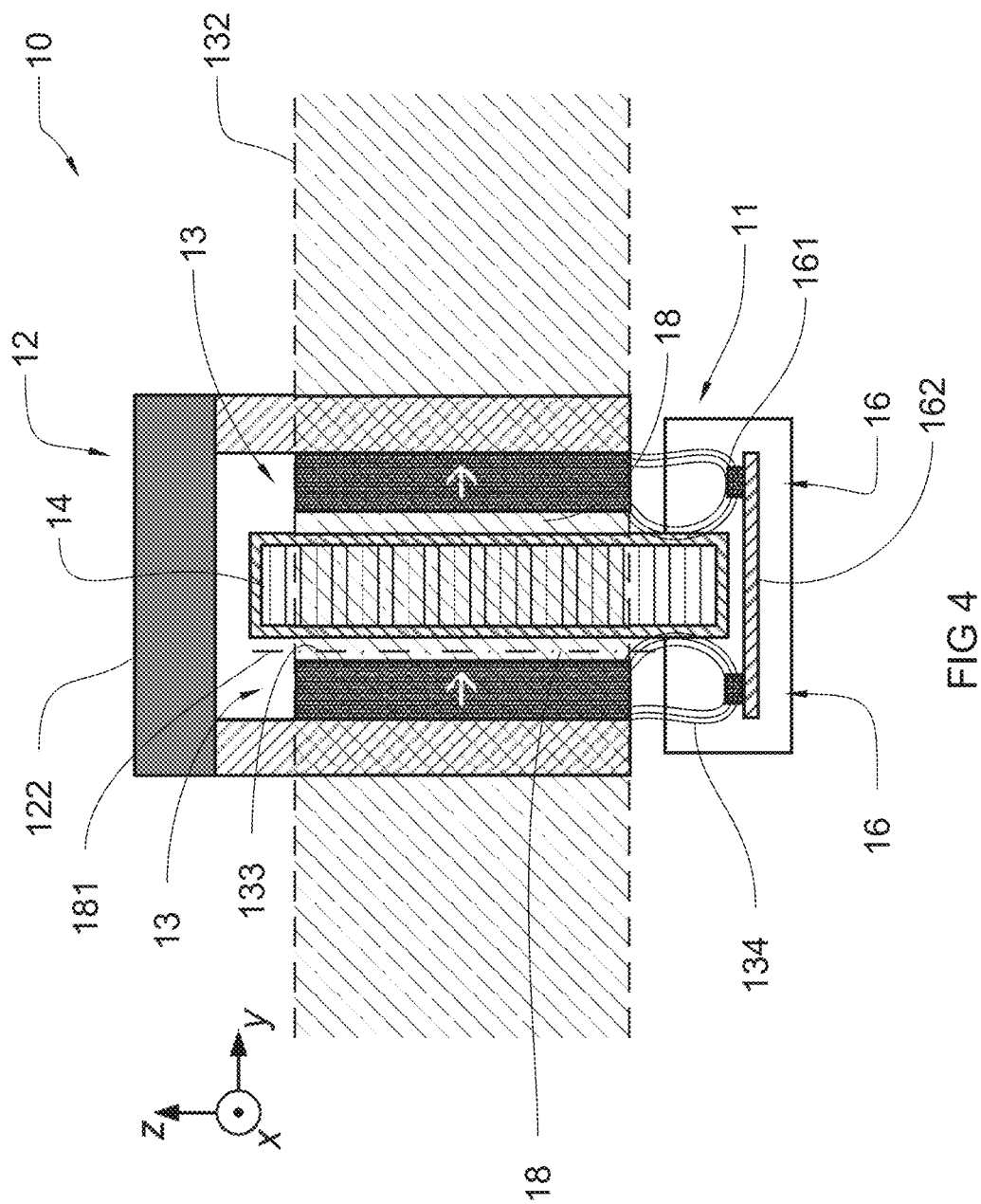
FIG. 4 represents the view of FIG. 2 with indication of the band as in FIG. 3.

Referring to FIG. 3, the hatched band 132 which is obtained by orthogonal projection of the (perimeter of) magnet yoke 13 on the XZ-plane and translating it along the motion direction 101, represents the area in which magnetic interaction between the permanent magnets 131 and the coils 14 is highest. Extending this band 132 parallel to the Y-axis on the stator unit 11 marks the portion of the stator unit which is subjected to the highest magnetic field strength of the permanent magnets 131, as they pass along. This portion is indicated by a hatched band 132 in FIG. 4. Combining the hatched bands in FIGS. 3 and 4, a volume is obtained in which magnetic interaction is high. Therefore, any sensors 161 should be positioned outside of this volume. One may see from FIG. 4 that arranging the sensors 161 outside the volume indicated by bands 132 but still such that they sense the magnet yoke 13 passing by advantageously results in the sensors sensing a magnetic leakage field 134 of the permanent magnets 131. In aspects of the present disclosure, the sensors 161 are positioned to sense a magnetic leakage field 134 of the magnet yoke 13/permanent magnets 131 rather than the main field as the mover 12 passes along the respective stator unit 11.

Determining whether the sensor 161 is positioned outside band 132 is possible by projecting both the band 132 and the sensors 161 and by checking whether they overlap. Referring to FIG. 2, the white arrows indicate the direction of the North-to-South magnetic axis of permanent magnets 131. The magnetic field lines in air gap 18 will substantially run parallel to the Y-axis to then deflect in the stator unit 11. The XZ-plane substantially corresponds to a plane perpendicular to the magnetic field lines in air gap 18. The XZ-plane is furthermore parallel to the motion direction 101. It is therefore possible to define a median plane 181 of the air gap 18 which is parallel to the XZ-plane. Median plane 181 lies half way between, on the one hand, surface 133 of magnet yoke 13 which is exposed to the air gap 18 and is facing the stator unit 11, and on the other hand, the stator unit 11, e.g. surface 123 of the stator unit 11 exposed to the air gap. By orthogonal projection of band 132 on the one hand and sensor 161 on the other hand on the median plane 181, or, alternatively on any other plane parallel to the XZ-plane, it becomes possible to resolve whether there is any overlap between the two.

Advantageously, the sensors 161 are arranged at such positions where the magnetic field strength of the magnet yoke 13 is 20% or less than the (average) magnetic field in the air gap 18 within band 132, advantageously 15% or less, advantageously 10% or less.

There are a number of advantageous locations outside band 132 for positioning the sensors 161. As shown in FIG. 1, the sensors 161 are arranged (directly) underneath (or alternatively (directly) above) the coils 14. That is, the sensors 161 are positioned at substantially a same position as the coils 14 along the motion direction 101 (i.e. along X-axis). Compared to the case in which the sensors would be arranged ahead of or after the coils 14 along motion direction 101, the location underneath or above has the advantage that the stator units 11 (and hence the coils 14) can be arranged closer to one another, which increases the force density of the linear motor, as available volume is used more efficiently.

Figure 5:
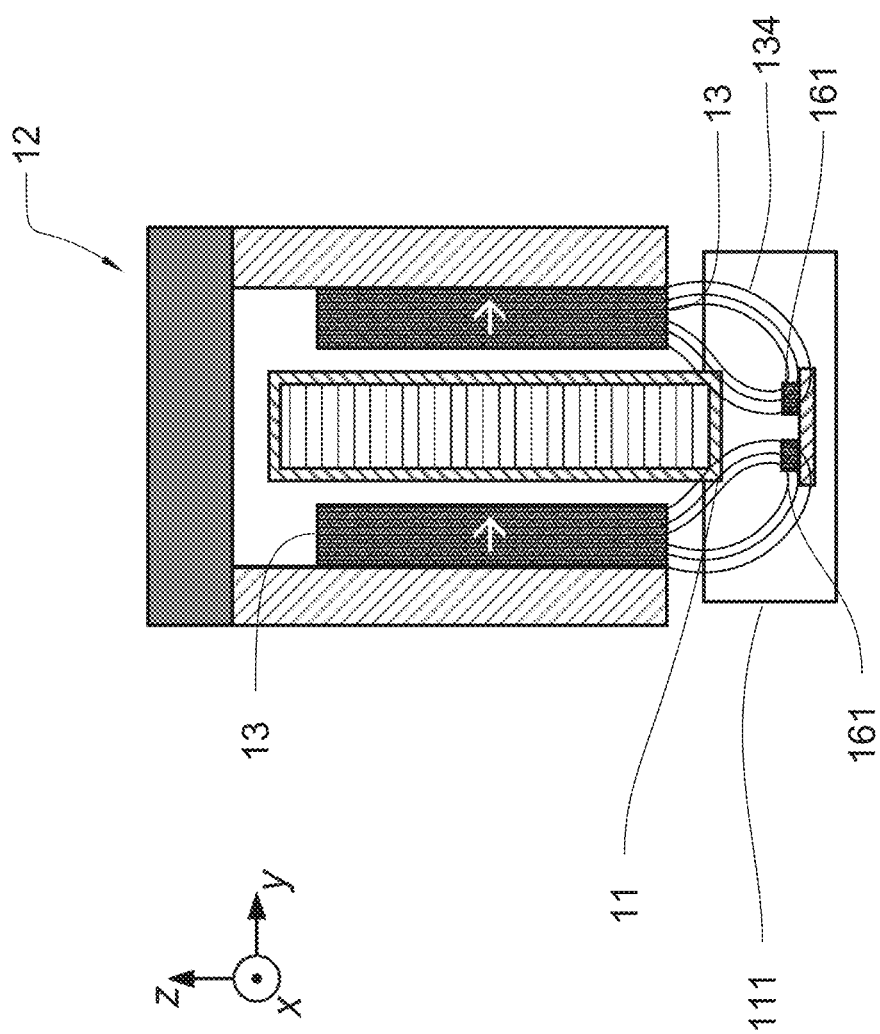
FIG. 5 represents a cross sectional view of the permanent magnet linear motor as in FIG. 2, in which the position of the magnetic field sensors is changed.

Referring to FIG. 2, the sensors 161 can be arranged at a same Y-position as the permanent magnets 131, i.e. directly underneath (or above) the permanent magnets. More generally, the sensors 161 can be arranged at a same Y-position of the mover 12. Alternatively, as shown in FIG. 5, the sensors 161 can be arranged at a same Y-position as the coils 14, i.e. directly underneath (or above) the coils. More generally, the sensors 161 can be arranged at a same Y-position as the stator unit 11. Yet alternatively, the sensors 161 can be arranged at a same Y-position as the air gap 18. At any of the above positions outside band 132, the magnetic field generated by the coils 14 is weaker, such that the sensor signal is less influenced by the coil magnetic field. Additionally, at those locations, the sensors are arranged further away from a thermal hotspot of the linear motor, typically corresponding to the area of the coils 14. Therefore, the sensors are less likely to warm up due to heat generated by currents flowing through the coils.

The position sensing device 16 can comprise a printed circuit board (PCB) 162 on which the sensors 161 are arranged and can comprise corresponding electronics. PCB 162 is advantageously fixed to the stator unit 11, whereas the electronics can be integrated in stator unit (on PCB 162) or as an add-on module. Advantageously the stator unit comprises a support 111 and the sensors 161 are embedded in the support. Support 111 can be made of a non-magnetic material, such as aluminum. Support 111 advantageously falls outside band 132.

Advantageously, each position sensing device 16 comprises at least two sensors 161 positioned at an equidistance of $\tau_p/N$ in the motion direction 101, where $\tau_p$ is the pole pitch of the magnet yoke 13 and N the number of sensors 161. Such an arrangement allows for obtaining multiple displaced waveforms, such as shown in FIG. 7, allowing not only to determine a position, but also a direction of motion of mover 12. The amplitude of the sensor signal is dependent on the location of the sensors 161 with respect to the magnet yoke 13 and the size of the magnet yoke, the permanent magnet size and material. The frequency of the sensor signal is dependent on the velocity and the pole pitch, $\tau_p$.

Figure 6:
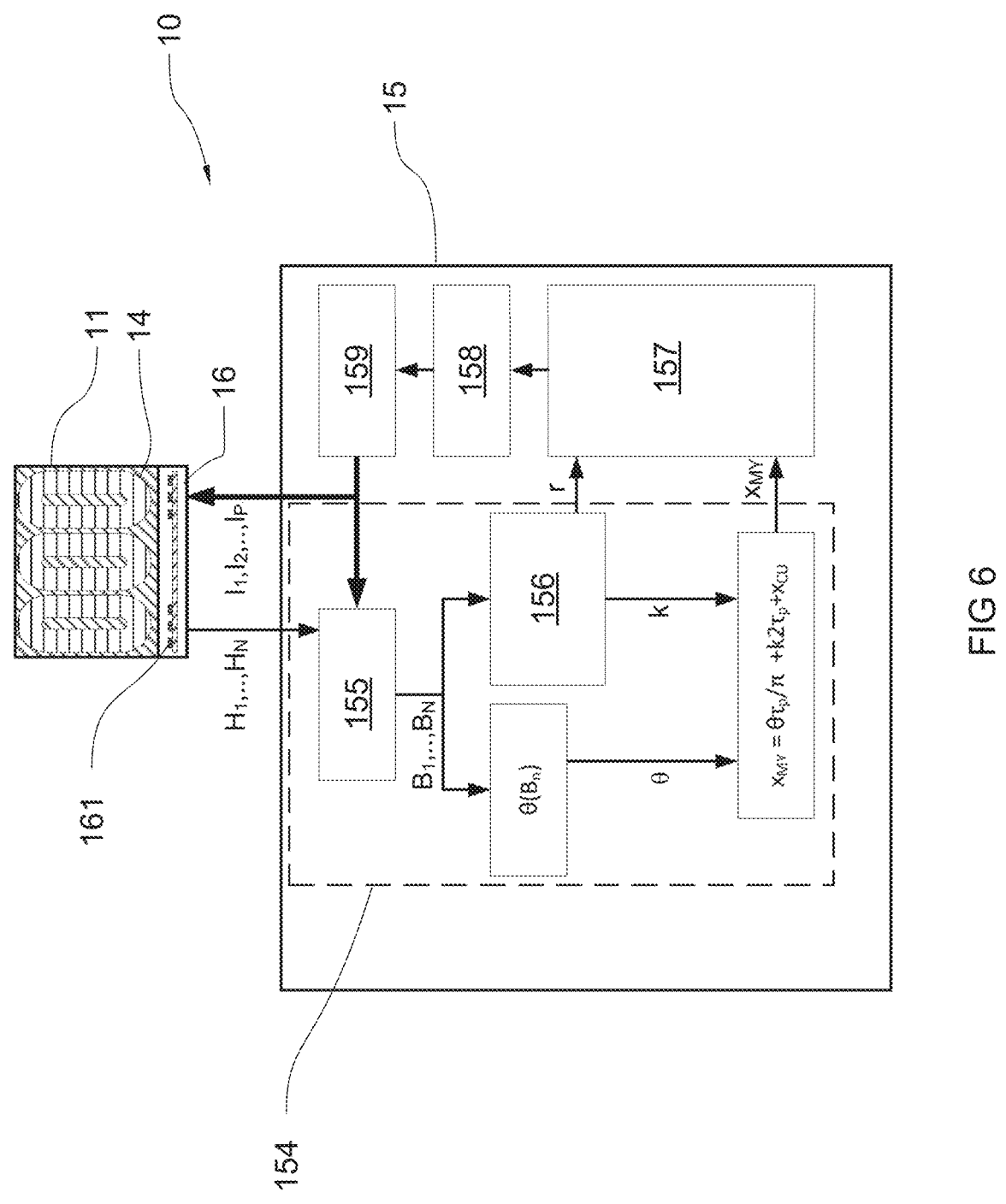

Referring to FIG. 6, the drive unit 15 can comprise a computation unit 154 implementing a position sensor algorithm configured to determine the position of magnet yoke 13 based on the measured magnetic field from the sensors 161. An algorithm which calculates the position of magnet yoke 13 based on the magnetic field $B_{m,1}, \ldots, B_{m,N}$ measured from the sensors 161 can be derived as follows. Initially, no magnet yoke 13 is present above the stator unit, no magnetic field is measured and hence no position is determined. The magnet yoke is said to be "out of range", r=0.

Only the magnetic field due to the magnet yoke 13 is of interest and hence, the magnetic field generated by the coils 14 should be compensated for. To this end, computation unit 154 comprises a coil field compensation unit 155 which can operate as follows. The magnetic field of coils 14 can be compensated for by measuring the drive current through the coils and multiplying by a compensation gain matrix according to the formula:

$$B_{c,i} = B_{m,i} - CI$$

where $B_{m,i}$ is the vector containing the magnetic field measurements of sensors 161, I is the vector of measured phase currents of the coils and C is the compensation matrix. The measured magnetic field is approximately linearly dependent on the level of current, hence, the compensated magnetic field measurement can be written in full as:

$$\begin{bmatrix} B_{c,1} \\ B_{c,2} \\ \vdots \\ B_{c,N} \end{bmatrix} = \begin{bmatrix} B_{m,1} \\ B_{m,2} \\ \vdots \\ B_{m,N} \end{bmatrix} - C \begin{bmatrix} I_1 \\ I_2 \\ \vdots \\ I_p \end{bmatrix} = \begin{bmatrix} B_{m,1} \\ B_{m,2} \\ \vdots \\ B_{m,N} \end{bmatrix} - \begin{bmatrix} C_{1,1} & \cdots & C_{P,1} \\ \vdots & \ddots & \vdots \\ C_{1,N} & \cdots & C_{P,N} \end{bmatrix} \begin{bmatrix} I_1 \\ I_2 \\ \vdots \\ I_p \end{bmatrix}$$

for N number of sensors 161 and P number of phases. In C, every element describes a coupling factor of every phase current to every sensor 161, e.g. in Tesla/Ampere units. The compensation matrix C can be obtained by:

measuring the magnetic field without presence of a magnet yoke while applying current through the individual phases, analytical derivation, and/or finite element analysis.

In case the coil units are mounted very close to each other, the current measurements of neighboring drives can be shared amongst each other and be taken into account in the compensation matrix to further improve accuracy if necessary.

The presence of a magnet yoke 13 (mover 12) can be detected through one or a combination of different methods. Suitable methods are:

verifying that the amplitude of the individual sensor signals is above a predetermined threshold, verifying that the sum of the individual sensor signals is above a predetermined threshold, and verifying that the sum of the individual sensor signals squared is above a predetermined threshold.

Depending on the method and threshold values, the magnet yoke can be detected earlier, at the expense of a lower accuracy since the magnetic fields are smaller and insufficient to extract accurate position information.

The computation unit 154 further comprises an 'in range' detection and counter unit 156. When the magnet yoke is within range of the sensor, the counter, k, is reset to zero if the magnet yoke enters from the right or set to $N_p/2-1$ if the magnet yoke enters from the left ($N_p$ is the number of poles of the magnet yoke). This distinction can be made either by checking the individual signals of sensors 161 and comparison; and/or using two sensor groups (left and right) as is for example also drawn in FIG. 1 for N=3. In this case, the position information from both sensor groups can be merged using windowing functions.

The following description assumes the use of a single group of sensors 161. When the magnet yoke 13 is detected, the phase information can be deducted from the sensor measurements $B_{c,i}$ as:

$$\theta = a\tan 2 \left( [K_{s1} \ K_{s2} \ \ldots \ K_{sN}] \begin{bmatrix} B_{c,1} \\ B_{c,2} \\ \vdots \\ B_{c,N} \end{bmatrix}, [K_{c1} \ K_{c2} \ \ldots \ K_{cN}] \begin{bmatrix} B_{c,1} \\ B_{c,2} \\ \vdots \\ B_{c,N} \end{bmatrix} \right)$$

where a tan 2 is the two argument inverse tangent function which takes into account the appropriate quadrant. The factors $K_{si}$ and $K_{ci}$ are given by:

$$K_{si} = \sin\left(\frac{\pi i}{N}\right), K_{ci} = \cos\left(\frac{\pi i}{N}\right).$$

This formula only provides unique values within the range of 0 . . . $2\pi$ and hence, a counter k is included which resets upon the moment of magnet yoke detection and which counts the number of transitions of θ from 2π to 0 or vice versa. Hence, the absolute position information is obtained as $$x_{MY} = \frac{\theta \tau_p}{\pi} + k2\tau_p + x_{CU}$$

where $x_{CU}$ is the overall position of the coil unit with respect to the reference point.

By using the a tan 2 function, the accuracy of the method becomes independent of the amplitude of the waveform shown in FIG. 7 and hence, not significantly dependent on the lateral displacement in Y and Z. Lateral displacements in Y and Z still have a minor effect on the harmonic content of the waveform shown in FIG. 7. To minimize this influence, a double sided measurement can be considered, as indicated in FIG. 2. A double set of sensors 161 is arranged symmetrically with respect to the coil array at a same Y-position. Alternatively, a double set of sensors 161, 161' can be arranged symmetrically with respect to the magnet yoke 13. A double sided measurement offers better robustness for lateral displacements in Y, where both measurements are combined:

$$B_{m,i} = B_{ml,i} B_{mr,i}$$

where $B_{ml,i}$ is the signal sensed by the left sensor 161' and $B_{mr,i}$ the signal sensed by the right sensor 161. This is particularly useful in cases where there is a large variation in the air gap 18.

Referring to FIG. 7, the sensors 161 are capable of sensing end effects of the approaching or departing magnet yoke 13 due to the finite length of the magnet yoke. The respective signal is represented in regions 71 and 72. These end effects allow for detecting a time instant at which the magnet yoke enters the sensing area and therefore allow for providing an absolute position measurement. In region 70, the magnet yoke is in range, and relative measurement can be performed as indicated above. Therefore, sensors as described hereinabove allow to integrate both absolute position sensing and relative position sensing in one and the same sensing element.

The above measurement procedures are only possible when the sensor 161 continuously operates below saturation level, which is advantageously possible by placing the sensors 161 at locations as indicated above. Advantageously, when the sensors 161 are placed at locations as indicated above, a level of the magnetic field sensed by sensors 161 is 100 mT or less, advantageously 90 mT or less. Absent any saturation, the signal captured by sensors 161 will be sinusoidal as shown in FIG. 7 allowing for a purely analog measurement of the yoke position. This obviates the need for linear encoders, such that the linear permanent magnet motors according to the present disclosure can be more economical.

Referring again to FIG. 6, the drive 15 is therefore configured to read an output $H_1, \ldots, H_N$ of the sensors 161 (relating to a magnetic field of the magnet yoke 13 passing along) and to determine an amplitude of a phase current $I_1, I_2, \ldots, I_P$ applied to the stator coil 14 based on the output of sensor 161. To this end, the binary indicator r output from detection and counter unit 156 indicating whether or not an 'in range' position of the magnet yoke is detected (e.g. r=1 if magnet yoke is in range and 0 if out of range) and the absolute position information $x_{MY}$ from the computation unit 154 are fed to a motion controller unit 157, which is coupled to a commutation unit 158 and further to an end stage 159 which delivers the phase currents $I_1, I_2, \ldots, I_P$.

The invention claimed is:

1. A linear permanent magnet motor, comprising:
   a stator unit comprising at least one coil;
   a mover comprising an array of permanent magnets, wherein the mover is arranged to move along a motion direction, the array of permanent magnets being spaced apart from the stator unit by an air gap in which electromagnetic fields created by the array of permanent magnets and by the at least one coil are configured to interact to generate traction;
   a position sensing device operable to determine a position of the mover relative to the stator unit,
   wherein the position sensing device comprises a sensing element operable to sense a magnetic field of the array of permanent magnets, the sensing element being fixed to the stator unit,
   wherein the sensing element is positioned such that the sensing element is within a magnetic leakage field of the array of permanent magnets when the array of permanent magnets is positioned in correspondence with the sensing element; and
   a control unit operable to read an output of the sensing element,
   wherein the control unit is operable to compensate the output for a magnetic field of the at least one coil based on a measurement of a drive current through the at least one coil.

2. The linear permanent magnet motor of claim 1, wherein the air gap is interposed between the array of permanent magnets and the at least one coil.

3. The linear permanent magnet motor of claim 1, wherein the sensing element is positioned along the motion direction at a position in correspondence of a position with the at least one coil.

4. The linear permanent magnet motor of claim 1, wherein the position sensing device comprises a plurality of the sensing element arranged at a first side of the at least one coil towards the air gap and at a second side of the at least one coil opposite the first side.

5. The linear permanent magnet motor of claim 1, wherein the mover comprises a portal structure and a pair of the array of permanent magnets mounted on the portal structure at a same position along the motion direction and at opposite sides relative to the at least one coil.

6. The linear permanent magnet motor of claim 1, wherein the permanent magnets in the array of permanent magnets are arranged juxtaposed along the motion direction with alternating polarity and spaced apart with a same pitch, and wherein the position sensing device comprises a plurality of the sensing elements spaced apart along the motion direction at a distance equal to the pitch divided by a number of the plurality of sensing elements.

7. The linear permanent magnet motor of claim 1, wherein the control unit is operable to determine an amplitude of a phase current applied to the at least one coil based on the output of the sensing element.

8. The linear permanent magnet motor of claim 1, wherein the magnetic leakage field consists essentially of a portion of the electromagnetic field generated by the array of permanent magnets, wherein the portion does not interact with the electromagnetic field generated by the at least one coil.

9. The linear permanent magnet motor of claim 1, wherein the control unit is configured to compensate the output of the sensing element for the magnetic field of the at least one coil based on the drive current multiplied by a compensation gain matrix.

10. The linear permanent magnet motor of claim 1, wherein the position sensing device comprises a plurality of the sensing element arranged at a first side of the array of permanent magnets towards the air gap and at a second side of the array of permanent magnets opposite the first side.

11. The linear permanent magnet motor of claim 10, wherein the position sensing device comprises a pair of the sensing element and is operable to determine a position by differential measurement between the pair of sensing elements.

12. The linear permanent magnet motor of claim 1, comprising a plurality of the stator units arranged juxtaposed to one another along the motion direction.

13. The linear permanent magnet motor of claim 12, comprising one of the position sensing devices for each of the plurality of stator units.

14. The linear permanent magnet motor of claim 1, wherein the sensing element is embedded in a support made of a non-magnetic material and fixed to the stator unit.

15. The linear permanent magnet motor of claim 14, wherein the array of permanent magnets has a surface exposed to the air gap, the surface being planar and parallel to the motion direction,
   wherein the air gap has a median plane parallel to the surface,
   wherein the sensing element is positioned such that an orthogonal projection of the sensing element on the median plane falls outside a band formed by an orthogonal projection of the array of permanent magnets on the median plane when moving along the motion direction, and
   wherein the support is positioned such that an orthogonal projection of the support on the median plane falls outside the band.

16. The linear permanent magnet motor of claim 14, wherein the array of permanent magnets has a surface exposed to the air gap, the surface being planar and parallel to the motion direction,
   wherein the air gap has a median plane parallel to the surface,
   wherein the sensing element is positioned such that an orthogonal projection of the sensing element on the median plane falls outside a band formed by an orthogonal projection of the array of permanent magnets on the median plane when moving along the motion direction, and
   wherein the support projects from the stator unit along a direction perpendicular to the median plane towards the air gap.

17. The linear permanent magnet motor of claim 1, wherein the array of permanent magnets has a surface exposed to the air gap, the surface being planar and parallel to the motion direction, wherein the air gap has a median plane parallel to the surface.

18. The linear permanent magnet motor of claim 17, wherein the sensing element is positioned such that an orthogonal projection of the sensing element on the median plane falls outside a band formed by an orthogonal projection of the array of permanent magnets on the median plane when moving along the motion direction.

19. The linear permanent magnet motor of claim 17, wherein the sensing element is positioned along a direction perpendicular to the median plane at a position in correspondence with one of the air gap, the stator unit, and the mover.

20. The linear permanent magnet motor of claim 17, wherein the sensing element is positioned along a direction perpendicular to the median plane at a position in correspondence with the mover, wherein the sensing element is positioned along a direction perpendicular to the median plane at a position in correspondence with the array of permanent magnets.

* * * * *